US006698208B2

(12) United States Patent
Teets

(10) Patent No.: US 6,698,208 B2
(45) Date of Patent: Mar. 2, 2004

(54) ATOMIZER FOR A COMBUSTOR

(75) Inventor: J. Michael Teets, Hobe Sound, FL (US)

(73) Assignee: Elliott Energy Systems, Inc., Stuart, FL (US)

( * ) Notice: Subject to any disclaimer, the term of this patent is extended or adjusted under 35 U.S.C. 154(b) by 120 days.

(21) Appl. No.: 10/017,917

(22) Filed: Dec. 14, 2001

(65) Prior Publication Data

US 2003/0110776 A1 Jun. 19, 2003

(51) Int. Cl.[7] .................................................. F02C 7/22
(52) U.S. Cl. ............................................ 60/740; 60/748
(58) Field of Search .......................... 60/740, 742, 748, 60/804

(56) References Cited

U.S. PATENT DOCUMENTS

| | | | | |
|---|---|---|---|---|
| 3,283,502 A | | 11/1966 | Lefebvre | |
| 3,474,970 A | | 10/1969 | Simmons et al. | |
| 3,530,667 A | | 9/1970 | Bryan | |
| 4,198,815 A | | 4/1980 | Bobo et al. | |
| 5,579,645 A | * | 12/1996 | Prociw et al. | 60/740 |
| 6,038,864 A | | 3/2000 | Prade et al. | |
| 6,082,113 A | | 7/2000 | Prociw et al. | |
| 6,289,676 B1 | * | 9/2001 | Prociw et al. | 60/740 |

* cited by examiner

*Primary Examiner*—Louis J. Casaregola
(74) *Attorney, Agent, or Firm*—Webb Ziesenheim Logsdon Orkin & Hanson, P.C.

(57) ABSTRACT

An atomizer for use with a combustor in a gas turbine has a body with a fuel passageway extending through the center of the body. A plurality of channels extends within the body about the passageway centerline, and are oriented along a circumferential angle about the passageway centerline to deliver air at the discharge end of the passageway with an axially whirling motion. The channels are simultaneously oriented along an axial angle about the passageway centerline, thereby directing the flow of air to converge toward the passageway centerline, mix with the fuel, and then at least in part diverge from the passageway centerline. The whirling air intersects with the fuel at the exit of the nozzle to effectively atomize both the air and fuel thereby providing a homogeneous air/fuel mixture to the combustion chamber.

27 Claims, 3 Drawing Sheets

ATOMIZER FOR A COMBUSTOR

BACKGROUND OF THE INVENTION

1. Field of the Invention

This invention relates to atomizers and, more particularly, to airblast atomizers used in combustors for gas turbine engines.

2. Description of the Prior Art

The use of air to atomize liquids, such as fuel for combustion in gas turbines, is well known and the methods employed vary widely depending on the desired results, which are influenced by the fineness of atomization, the properties of liquid fuel, the availability of air for the atomizing process and the homogenity of the fuel/air mixture, referred to as F/A mixedness.

For example, where compressed air can be supplied from an external source, a device such as that disclosed in U.S. Pat. No. 3,474,970 can be employed, in which high velocity air is applied to one side of a conical fuel sheet produced by the discharge of a conventional spin-chamber or "Simplex" nozzle and flowing on the interior surface of a cone. The application of this principal, however, is limited to relatively low fuel flow rates, and the nozzle operates on a conventional fuel pressure atomizer at a high flows produced using compressed air. In certain applications the use of compressed air is not feasible and is preferred to employ the air which is fed into the combustion chamber from the engine compressor to atomize the fuel. This method is disclosed in U.S. Pat. No. 3,283,502 which describes generally spreading the fuel into a thin film on the surface and atomizing the fuel sheet as it leads the edge of the surface. U.S. Pat. No. 3,530,667 also shows the fuel being spread over a relatively large surface, developing a thin sheet of fuel, for ease of mixing with air, with the air being applied to both sides of the fuel sheet leaving the edge of the surface. Such fuel nozzles are described as the "prefilming" type. In both of these cases, it is evident that the success of the atomization process can be effected by the behavior of the liquid film since in general the size of the atomized drop produced is dependent on the thickness of the fuel film at the point of breakup. Variations of fuel film thickness can occur for various reasons, and this could give rise to poor atomization performances. Optimum atomization of the fuel/air mixture is important in controlling the flame temperature during combustion. The highest source of $NO_x$ is a high flame temperature. Maintaining a homogeneous fuel/air mixture (good mixedness) prior to combustion provides a much higher level of control for a desired flame temperature.

An atomizer is desired that will promote uniform atomization of a homogenous fuel/air mixture for combustion, thereby promoting low micron-size fuel particles and allowing closer control of the flame temperature, which in turn produces a more efficient engine cycle while at the same time minimizing the level of undesirable $NO_x$ and other emission species

SUMMARY OF THE INVENTION

One embodiment of the subject invention is directed to an atomizer for use with a combustor in a gas turbine, wherein the atomizer is comprised of:

a body;

fuel passageway within the body extending along a passageway centerline, wherein the fuel passageway has an entry end and a discharge end; and a plurality of channels extending within the body about the passageway centerline and spaced around the discharge end of the fuel passageway, wherein at the discharge end of the passageway the channels are oriented along a circumferential angle about the passageway centerline to deliver air at the discharge end of the passageway centerline to deliver air at the discharge of the passageway with a whirling motion and wherein the channels are simultaneously oriented along an axial angle about the passageway centerline thereby converging toward the passageway centerline to deliver air at the discharge end toward the passageway centerline.

Another embodiment of the subject invention is directed to an atomizer for use with a combustor in a gas turbine, wherein the atomizer is comprised of:

a) providing a stream of fuel against a fuel passageway such that the fuel conforms to the wall of the passageway and exits in a shape conforming to the wall;

b) providing a flow of air which both rotates and diverges toward and intersects with the stream of fuel thereby atomizing the stream of fuel.

A third embodiment of the subject invention is directed to an annular combustor comprising:

a) a combustion chamber;

b) at least one atomizer for receiving and mixing fuel and air for introduction to the combustion chamber;

c) wherein the atomizer is comprised of
   1) a body,
   2) a fuel passageway within the body extending along a passageway centerline, wherein the fuel passageway has an entry end and a discharge end; and
   3) a plurality of channels extending within the body about the passageway centerline and spaced around the discharge end of the fuel passageway, wherein at the discharge end of the passageway the channels are oriented along a circumferential angle about the passageway centerline to deliver air at the discharge end of the passageway with a whirling motion and wherein the channels are simultaneously oriented along an axial angle about the passageway centerline thereby converging toward the passageway centerline to deliver air at the discharge end toward the passageway centerline.

DESCRIPTION OF THE PREFERRED EMBODIMENT

Figure 1:
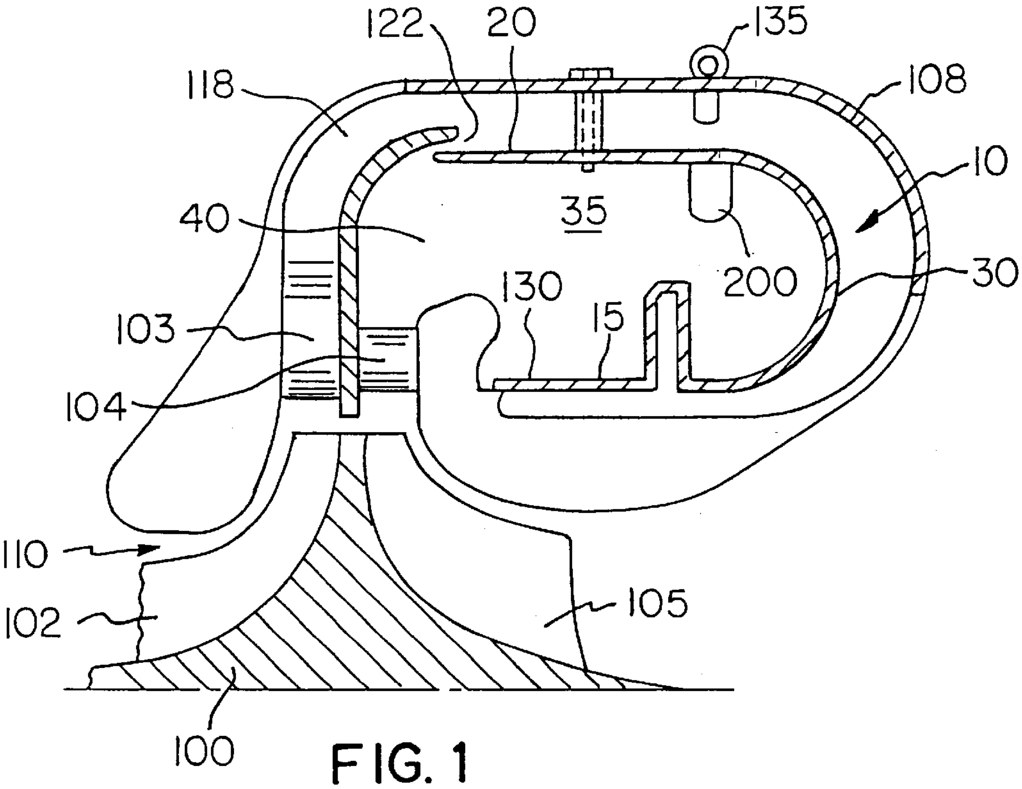
FIG. 1 is a cross-sectional side view of a compressor/turbine including a combustor with an atomizer in accordance with the present invention.
Figure 2:
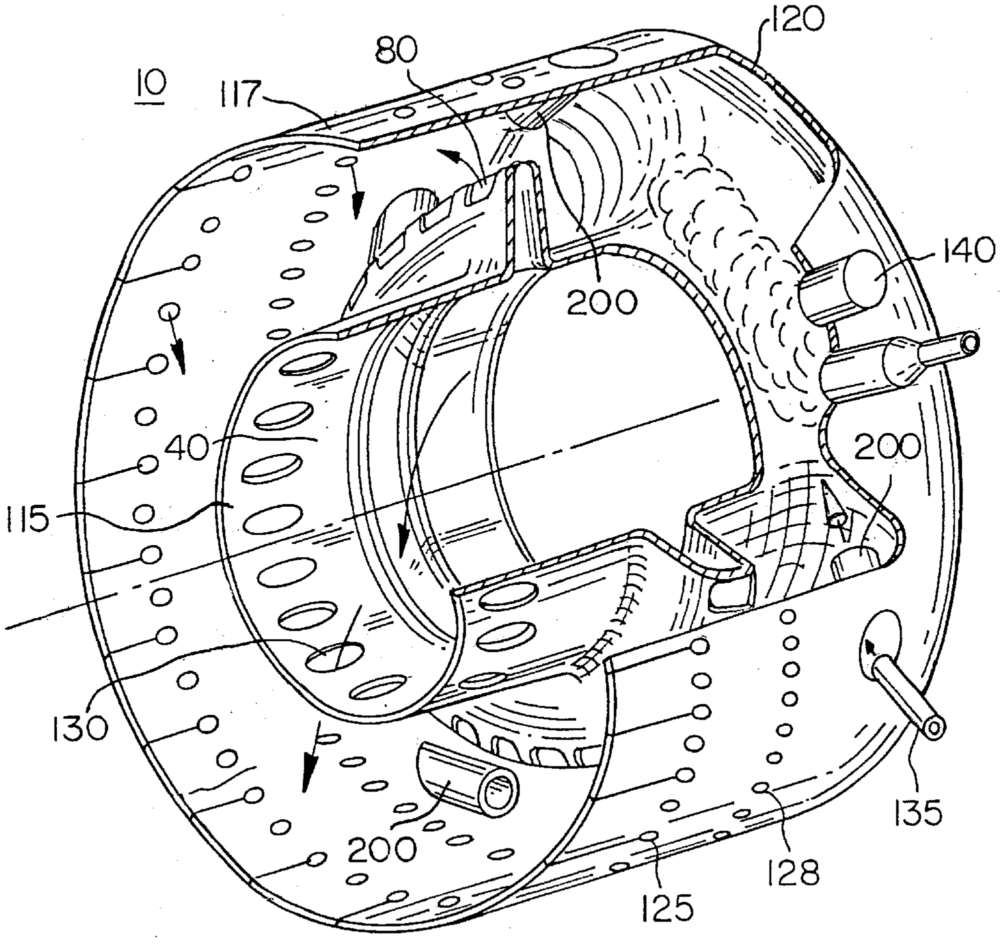
FIG. 2 is a perspective view of a combustor having an atomizer in accordance with the present invention.

FIG. 1 illustrates an annular combustor 10 connected to a compressor/turbine arrangement 100. The compressor/turbine arrangement 100 includes compressor blades 102, a diffuser 103, turbine blade nozzle channels 104, and turbine blades 105 positioned around a rotary drive shaft (not shown), which rotates about a central axis (not shown). The combustor 10, further illustrated in FIG. 2, is comprised of an annular inner shell 115 and a co-axial annular outer shell 120. A dome end wall 130 connects the inner shell 115 and the outer shell 120, wherein the inner shell 115, the outer shell 120 and the dome end wall 130 define an annular combustion chamber 35.

Returning to FIG. 1, within the compressor/turbine arrangement 100, an annular housing wall 108 is positioned opposite to the exit end 40 of the combustor 10 to enclose the combustion chamber 35.

Air entering the air intake passage 110 positioned adjacent to the compressor blades 102 is directed through passageway 118 along the exterior surface of the combustor 10, and is introduced into the combustion chamber 35 through a number of passageways 125, 128, 130 and openings 80 (FIG. 2) extending through the walls of the combustor 10. Furthermore air is introduced to the combustion chamber 35 at the end 122 of passageway 118. The combustion chamber 35, the air path 118 and the turbine blades 105 are in fluid communication with each other. A plurality of fuel/air atomizers 200 extend through the wall of the combustor 10 to provide fuel delivery to the chamber 35. The fuel/air atomizers 200, which are tubular in shape, are adapted to direct liquid or gas fuel from fuel injectors 135 and compressed air or oxygen into the combustion chamber 35. An igniter 140 passes through the combustor 10 and into the combustion chamber 35, where it may ignite the air/fuel mixture within the chamber 35 until the combustion is self-sustaining. Of significant importance in providing a homogeneous combustion is the design of the atomizers 200.

Figure 3:
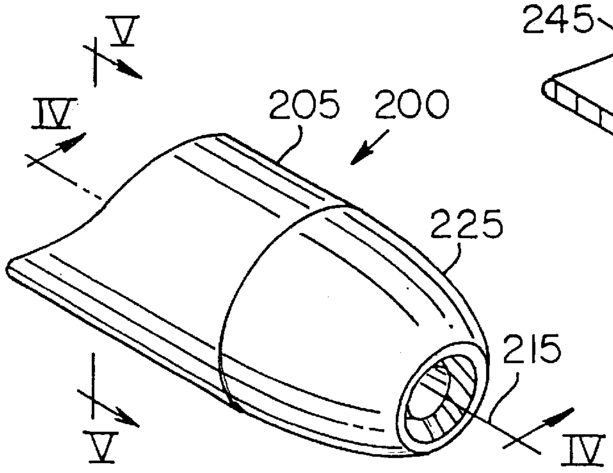
FIG. 3 is a perspective view of an atomizer in accordance with the present invention.
Figure 3A:
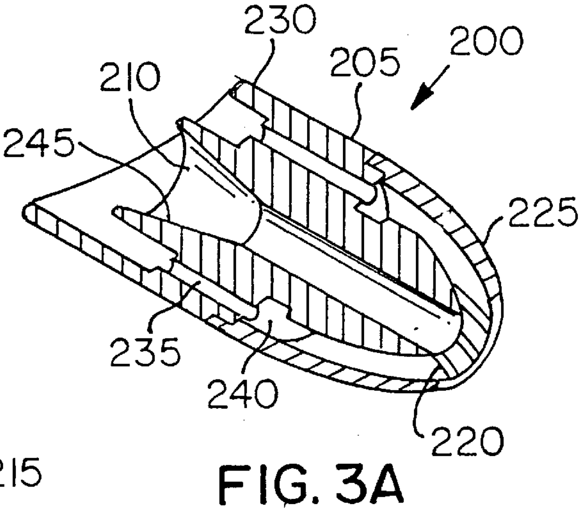
FIG. 3A is a cut-away perspective view identical to that in FIG. 3.

Directing attention to FIGS. 3 and 3A, an atomizer 200 for use with a combustor in a gas turbine is comprised of a body 205 with a fuel passageway 210 within the body 205 extending along a passageway centerline 215. The fuel passageway 210 has an entry end 212, and a discharge end 214.

Figure 6:
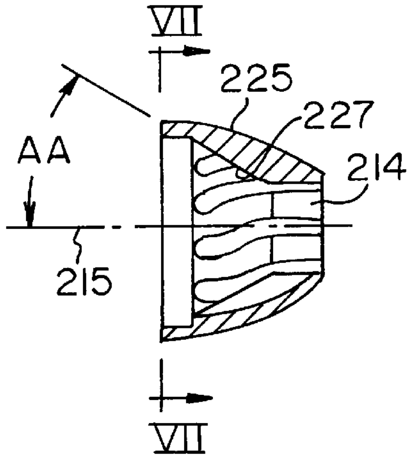
FIG. 6 is a cross-sectional side view of the atomizer tip.

A plurality of channels 220 (FIGS. 3A and 7) extend within the body 205 about the passageway centerline 215 are spaced around the discharge end 214 of the fuel passageway 210. At the discharge end 214 of the passageway 210, channels 220 are oriented along a circumferential angle CA (FIG. 7), about the passageway centerline 215 to deliver air at the discharge end 214 of the passageway 210 with a whirling motion. The channels 220 are simultaneously oriented along an axial angle AA (FIG. 6), about the passageway centerline 215 and converge toward the passageway centerline 215 to deliver air at the discharge end 214 in a direction approximately tangential to the wall 211 of the fuel passageway 210.

The circumferential angle CA may be between 5° and 60° and preferably is approximately 30°.

The channels 220 may diverge toward the passageway centerline 215 at an axial angle AA of between 5° and 60° with a preferred angle of approximately 30°.

Figure 7:
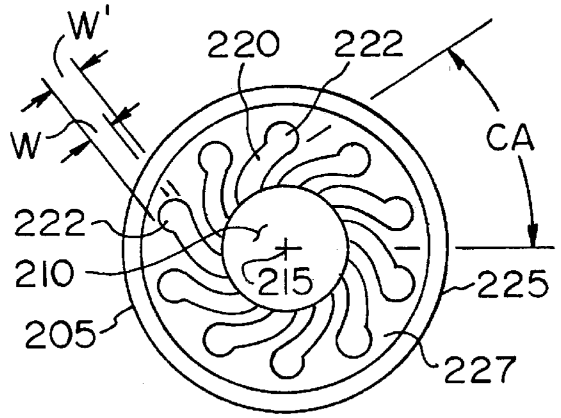
FIG. 7 is an end view of the atomizer tip along lines VII—VII in FIG. 6.

Each of the channels 220 may follow a helix about the passageway centerline 215 as illustrated in FIG. 7. Additionally, as a variation that may be easily envisioned from FIG. 7, the channels 220 may follow a linear path about the passageway centerline 215.

As seen in FIG. 7, the channels 220 may be evenly spaced about the periphery of the body 205. As further illustrated in FIGS. 3, 4 and 6, the channels 220 may be contained within a conical shaped tip 225 at the discharge end 214 of the passageway 210. Furthermore, as illustrated in FIGS. 3*a* and 7, the channels 220 may be located on the interior surface 227 of the tip 225.

Again directing attention to FIG. 7, the width W of each channel 220 increases to W' at the outer most radial point of that channel 220 to define an enlarged portion 222. This enlarged portion 222 permits easier alignment of the channel 220 with the passageways that supply air to them and yields a dependable flow area supply to the passageway of the channels 220.

Figure 4:
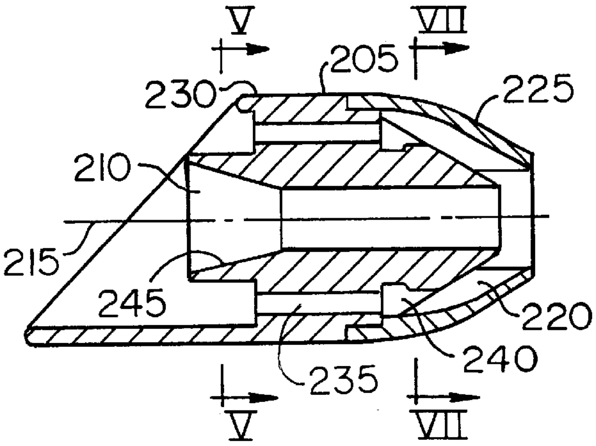
FIG. 4 is a cross-sectional side view of the atomizer illustrated in FIG. 3 along lines IV—IV.
Figure 5:
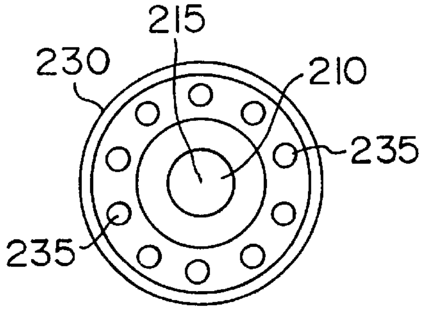
FIG. 5 is an end view of the atomizer illustrated in FIG. 3 along lines V—V.

As shown in FIG. 4, the body 205 is comprised of the tip 225 and a cylindrical base 230 directly behind the tip 225. Air is supplied to each channel 220 by a plurality of peripheral air passageways 235. The air passageways 235 extend through the base 230 and may be parallel to the passageway centerline 215. The peripheral passageways 235 are in fluid communication with the channels 220. As illustrated in FIG. 5, there may be ten peripheral passageways 235 equally spaced within the base 230 around the fuel passageway 210. Air is introduced to the air passageways 235 and travels through the channels 220. The number of peripheral passageways 235 is a function of the desired cooling and the desired flow.

Figure 4A:
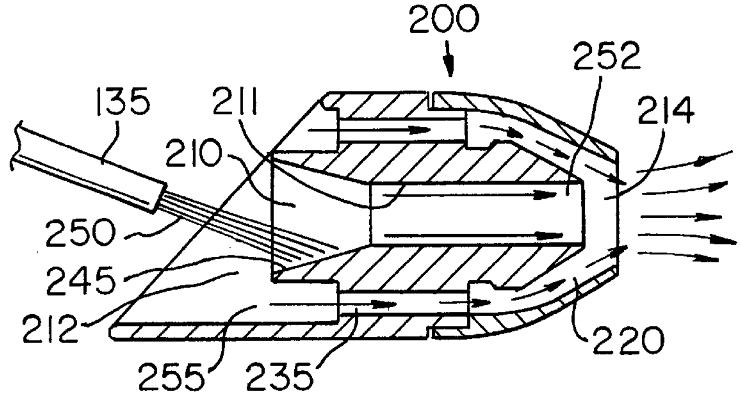
FIG. 4A is a cross-sectional view identical to that in FIG. 4 showing air and fuel flow through the atomizer and including a fuel injector which provides fuel to the atomizer.

The combustion chamber of the annular combustor may be exposed to temperatures in excess of 3000° Fahrenheit. Therefore, it is imperative to provide a mechanism to cool the atomizers 200. The air flowing through the air passageways 235, and subsequently through the channels 220, prior to the air being mixed with the fuel provides such cooling. To further enhance this cooling, an accumulating chamber 240 (FIGS. 3A and 4A) may be introduced between the air passageways 235 and the channels 220. This accumulating chamber 240 not only permits a longer residence time of the air within the body 205, but also makes it unnecessary to exactly align each air passageway 235 with a respective channel 220.

As illustrated in FIG. 4, the tip 225 may be a discrete part from the base 230. However, the tip 225 is integrally secured to the base 230 using conventional techniques such as welding.

The atomizer 200 has an enlarged conical portion 245 (FIGS. 3A and 4A) at the entry end 212 of the fuel passageway 210. A fuel injector 135 (FIG. 4A) is angled such that the flow of fuel from the injector 135 is directed against the enlarged conical portion 245 and forms a thin film on the surface on the wall 211 of the fuel passageway 210 to form the shape of a hollow cylinder 252. This thin film of fuel travels through the fuel passageway 210 and at the discharge end 214 is discharged. On the other hand, air traveling through the air passageway 235 and the channels 220 is directed in a rotating divergent path, which intersects with, and atomizes the thin film of fuel exiting from the fuel passageway 210. A portion of the air traveling through the channels 220 may be deflected by the hollow cylinder of fuel 252 to a direction diverging from the passageway centerline 215. Nevertheless, for the most part, the converging air flow merges with the hollow cylinder 252 of fuel. It is through this simple mechanism the atomizer 200, in accordance with the subject invention is believed to provide improved atomization of the air/fuel mixture using a low pressure fuel supply jet and as a result provides a greater level of homoganarity of the air/fuel mixture prior to the combustion chamber 35, thereby promoting better control of the combustion temperature and as a result, controlling the level of undesirable $NO_x$ and other emission species.

The subject invention is also directed to this method of atomizing fuel and mixing it with air for an annular combustor in a gas turbine engine. In particular, directing attention to FIG. 4A, a stream of fuel 250 is directed against the enlarged conical portion 245 of the fuel passageway wall 211, such that the fuel conforms to the wall 211 on the passageway 210 and, through air pressure differential across the combustor, exits in a shape conforming to the wall 211 in the approximate shape of a sleeve. Simultaneously, a flow of air 255 is provided through the air passageways 235 and into the channels 220 where it both rotates and converges toward and intersects in a shearing manner with the stream of fuel 250, thereby atomizing the stream of fuel 250 and, in a diverging swirling form, exiting at the discharge end 214.

The rotation and convergence imparted to the flow of air 255 by the atomizer tip 225 directs the air at an axial angle AA relative to the passageway centerline 215 of between 5° and 60°, preferably about 30°, and a circumferential angle CA relative to a line extending radically from the passageway centerline 215 of between 5° and 60°, preferably about 30°.

It is thought the present invention and many of its intended advantages will be understood from the foregoing description and that it will be apparent that various changes may be made in the form, construction and arrangement of the parts thereof, without departing from the spirit and scope of the invention, or sacrificing all of its material advantages, the form herein before described merely preferred or exemplary embodiments thereof.

What is claimed:

1. An atomizer for use with a combustor in a gas turbine, wherein the atomizer is comprised of:

a) a body, b) a fuel passageway within the body extending along a passageway centerline, wherein the fuel passageway has an entry end and a discharge end; and c) a plurality of channels extending within the body about the passageway centerline and spaced around the discharge end of the fuel passageway, wherein at the discharge end of the passageway the channels are oriented along a circumferential angle about the passageway centerline to deliver air at the discharge end of the passageway with a whirling motion, wherein the channels are simultaneously oriented along an axial angle about the passageway centerline thereby converging toward the passageway centerline to deliver air at the discharge end toward the passageway centerline, and wherein the channels are located on an interior surface of a conically shaped tip at the discharge end of the passageway.

2. The atomizer according to claim 1, wherein the circumferential angle is between 25° and 40°.

3. The atomizer according to claim 2, wherein the circumferential angle is 33°.

4. The atomizer according to claim 1, wherein each channel follows a helix about the passageway centerline.

5. The atomizer according to claim 1, wherein each channel follows a linear path about the passageway centerline.

6. The atomizer according to claim 1, wherein the channels diverge toward the passageway centerline at an axial angle of between 25°–35°.

7. The atomizer according to claim 6, wherein the channels diverge toward the passageway centerline at an axial angle of 30°.

8. The atomizer according to claim 1, wherein the channels are evenly spaced about the periphery of the body.

9. The atomizer according to claim 1, wherein each channel has a width and the value of the width of each channel adjacent to the discharge end of the passageway is greater than the value of the width of each channel away from the discharge end to define an enlarged portion.

10. The atomizer according to claim 1, wherein further including a base directly behind the tip.

11. The atomizer according to claim 10, wherein the base is cylindrical.

12. The atomizer according to claim 10, further including a plurality of peripheral air passageways extending through the base and parallel to the passageway centerline, wherein the peripheral passageways are in fluid communication with the channels.

13. The atomizer according to claim 12, wherein there are a plurality of peripheral air passageways spaced within the base around the fuel passageway.

14. The atomizer according to claim 12, further including an accumulating chamber between the peripheral passageways and the channels.

15. The atomizer according to claim 10, wherein the tip is a discrete part from the base.

16. The atomizer according to claim 15, wherein the tip is integral with the base.

17. The atomizer according to claim 1, wherein the fuel passageway has an enlarged conical portion at the entry end of the fuel passageway.

18. An atomizer for use with a combustor in a gas turbine, wherein the atomizer is comprised of:

a) a body, b) a fuel passageway within the body extending along a passageway centerline, wherein the fuel passageway has an entry end and a discharge end; and c) a plurality of channels extending within the body about the passageway centerline and spaced around the discharge end of the fuel passageway, wherein at the discharge end of the passageway the channels are oriented along a circumferential angle about the passageway centerline to deliver air at the discharge end of the passageway with a whirling motion and wherein the channels are simultaneously oriented along an axial angle about the passageway centerline thereby converging toward the passageway centerline to deliver air at the discharge end toward the passageway centerline;

d) wherein the fuel passageway has an enlarged conical portion at the entry end of the fuel passageway;

e) wherein the circumferential angle is 33°; and f) wherein the channels diverge toward the passageway centerline at an axial angle of 30°.

19. An annular combustor comprising:

a) a combustion chamber;

b) at least one atomizer for receiving and mixing fuel and air for introduction to the combustion chamber;

c) wherein the atomizer is comprised of 1) a body, 2) a fuel passageway within the body extending along a passageway centerline, wherein the fuel passageway has an entry end and a discharge end; and 3) a plurality of channels extending within the body about the passageway centerline and spaced around the discharge end of the fuel passageway, wherein at the discharge end of the passageway the channels are oriented along a circumferential angle about the passageway centerline to deliver air at the discharge end of the passageway with a whirling motions, wherein the channels are simultaneously oriented along an axial angle about the passageway centerline thereby converging toward the passageway centerline to deliver air at the discharge end toward the passageway centerline, and wherein the channels converge toward the passageway centerline at an axial angle of between 25° and 35°.

20. The atomizer according to claim 19, wherein the circumferential angle is between 25° and 40°.

21. The atomizer according to claim 19, wherein each channel follows a helix about the passageway centerline.

22. The atomizer according to claim 19, wherein the channels converge toward the passageway centerline at an axial angle of 30°.

23. The atomizer according to claim 19, wherein the channels are evenly spaced about the periphery of the body.

24. An atomizer for use with a combustor in a gas turbine, wherein the atomizer is comprised of:

a) a body, b) a fuel passageway within the body extending along a passageway centerline, wherein the fuel passageway has an entry end and a discharge end; and c) a plurality of channels extending within the body about the passageway centerline and spaced around the discharge end of the fuel passageway, wherein at the discharge end of the passageway the channels are oriented along a circumferential angle about the passageway centerline to deliver air at the discharge end of the passageway with a whirling motion, wherein the channels are simultaneously oriented along an axial angle about the passageway centerline thereby converging toward the passageway centerline to deliver air at the discharge end toward the passageway centerline, and wherein each channel follows a helix about the passageway centerline.

25. An atomizer for use with a combustor in a gas turbine, wherein the atomizer is comprised of:

a) a body, b) a fuel passageway within the body extending along a passageway centerline, wherein the fuel passageway has an entry end and a discharge end; and c) a plurality of channels extending within the body about the passageway centerline and spaced around the discharge end of the fuel passageway, wherein at the discharge end of the passageway the channels are oriented along a circumferential angle about the passageway centerline to deliver air at the discharge end of the passageway with a whirling motion, wherein the channels are simultaneously oriented along an axial angle about the passageway centerline thereby converging toward the passageway centerline to deliver air at the discharge end toward the passageway centerline, and wherein the channels diverge toward the passageway centerline at an axial angle of between 25° and 35°.

26. An atomizer for use with a combustor in a gas turbine, wherein the atomizer is comprised of:

a) a body, b) a fuel passageway within the body extending along a passageway centerline, wherein the fuel passageway has an entry end and a discharge end; and c) a plurality of channels extending within the body about the passageway centerline and spaced around the discharge end of the fuel passageway, wherein at the discharge end of the passageway the channels are oriented along a circumferential angle about the passageway centerline to deliver air at the discharge end of the passageway with a whirling motion, wherein the channels are simultaneously oriented along an axial angle about the passageway centerline thereby converging toward the passageway centerline to deliver air at the discharge end toward the passageway centerline, and wherein the fuel passageway has an enlarged conical portion at the entry end of the fuel passageway.

27. An annular combustor comprising:

a) a combustion chamber;

b) at least one atomizer for receiving and mixing fuel and air for introduction to the combustion chamber;

c) wherein the atomizer is comprised of 1) a body, 2) a fuel passageway within the body extending along a passageway centerline, wherein the fuel passageway has an entry end and a discharge end; and 3) a plurality of channels extending within the body about the passageway centerline and spaced around the discharge end of the fuel passageway, wherein at the discharge end of the passageway the channels are oriented along a circumferential angle about the passageway centerline to deliver air at the discharge end of the passageway with a whirling motion, wherein the channels are simultaneously oriented along an axial angle about the passageway centerline thereby converging toward the passageway centerline to deliver air at the discharge end toward the passageway centerline, and wherein each channel follows a helix about the passageway centerline.

* * * * *

UNITED STATES PATENT AND TRADEMARK OFFICE

CERTIFICATE OF CORRECTION

PATENT NO. : 6,698,208 B2
DATED : March 2, 2004
INVENTOR(S) : J. Michael Teets

It is certified that error appears in the above-identified patent and that said Letters Patent is hereby corrected as shown below:

Column 7,
Line 4, "whirling motions" should read -- whirling motion --.

Signed and Sealed this

Twenty-second Day of June, 2004

JON W. DUDAS
*Acting Director of the United States Patent and Trademark Office*